US008971949B2

(12) United States Patent
Michel et al.

(10) Patent No.: US 8,971,949 B2
(45) Date of Patent: Mar. 3, 2015

(54) APPARATUS, METHOD, SYSTEM AND PROGRAM FOR POWER CONTROL OR POWER SETTING (75) Inventors: Juergen Michel, Munich (DE); Bernhard Raaf, Neuried (DE); Agnieszka Szufarska, Gdansk (PL)

(73) Assignee: Nokia Siemens Networks Oy, Espoo (FI)

(*) Notice: Subject to any disclaimer, the term of this patent is extended or adjusted under 35 U.S.C. 154(b) by 803 days.

(21) Appl. No.: 13/121,339

(22) PCT Filed: Sep. 29, 2008

(86) PCT No.: PCT/EP2008/063042
§ 371 (c)(1),
(2), (4) Date: Jun. 27, 2011

(87) PCT Pub. No.: WO2010/034358
PCT Pub. Date: Apr. 1, 2010

(65) Prior Publication Data
US 2011/0250881 A1    Oct. 13, 2011

(51) Int. Cl.
*H04W 4/00* (2009.01)
*H04W 24/00* (2009.01)
*H04W 52/24* (2009.01)
*H04W 16/32* (2009.01)

(52) U.S. Cl.
CPC ............ *H04W 52/244* (2013.01); *H04W 16/32* (2013.01); *H04W 52/245* (2013.01)
USPC .......................................... 455/522; 370/318

(58) Field of Classification Search
CPC ... H04W 16/16; H04W 24/02; H04W 84/045; H04W 52/244; H04B 17/005
USPC ........................................... 455/522; 370/318
See application file for complete search history.

(56) References Cited

U.S. PATENT DOCUMENTS

| | | | | |
|---|---|---|---|---|
| 2007/0135153 | A1* | 6/2007 | Cai et al. ........................ | 455/522 |
| 2009/0042596 | A1* | 2/2009 | Yavuz et al. ................... | 455/522 |
| 2011/0128916 | A1* | 6/2011 | Kwon et al. ................... | 370/328 |
| 2011/0176468 | A1* | 7/2011 | Sridhara et al. ............... | 370/311 |
| 2012/0063341 | A1* | 3/2012 | Hamaguchi et al. .......... | 370/252 |
| 2012/0165032 | A1* | 6/2012 | Park et al. ................... | 455/452.1 |
| 2013/0100836 | A1* | 4/2013 | Szufarska et al. ............. | 370/252 |
| 2013/0137478 | A1* | 5/2013 | Szufarska et al. ............. | 455/522 |

FOREIGN PATENT DOCUMENTS

WO    WO 2008/093100  A2    8/2008

OTHER PUBLICATIONS

R4-081595, 3GPP TSG-RAN WG4 (Radio) Meeting #47bis, Munich, Germany Jun. 16-20, 2008, Vodafone, ip.access, Orange, "HNB Radio Resource Management Considerations", 4 pgs.
3GPP TR 25.820 V0.3.0 (Nov. 2007), "3$^{rd}$ Generation Partnership Project; Technical Specification Group Radio Access Networks; 3G Home NodeB Study Item Technical Report (Release 8)", 37 pgs.

* cited by examiner

*Primary Examiner* — Bobbak Safaipour
(74) *Attorney, Agent, or Firm* — Harrington & Smith (57) ABSTRACT

Embodiments provide an apparatus, method, product and storage medium for controlling or setting a transmit power of a femto cell depending on a received power of at least one neighboring macro cell.

17 Claims, 3 Drawing Sheets

APPARATUS, METHOD, SYSTEM AND PROGRAM FOR POWER CONTROL OR POWER SETTING

FIELD AND BACKGROUND

The invention generally relates to methods, apparatuses, systems, network elements and programs e.g. for power control or power setting for example for mobile communication or connection etc.

One or more embodiments of the invention relate to power control or setting for communication such as wireless communication like mobile wireless communications, such as e.g. third generation partnership project, 3GPP, long-term evolution (LTE & LTE-A). One or more embodiments may relate more specifically to one or more of network optimization, automated configuration and interference reduction in case of e.g. wide area cell with femto-cell co-channel deployment.

Femto-cells can be small or very small base stations. In fact femto cells may be so small that they can e.g. be placed in a customer's residence. In 3GPP standardization femto-cells are called "Home Node B" (HNB) for wideband code division multiple access, WCDMA, and "Home eNode B" (HeNB) for LTE. Such femto-cells are also termed femto base stations, home base stations or home Node Bs or evolved home Node Bs in this specification. Likewise, wide area cells or base stations are also termed macro cells, macro base stations, or macro or wide area Node Bs in this specification.

Implementations of femto-cells provide benefits for operators, users, and/or customers. Some benefits are provided by e.g. off-loading macro radio network traffic to femto nodes; improving coverage and/or capacity locally in a cost-effective manner; and/or implementing home-zone services to increase service offering and utilization.

Further, to utilize the spectrum efficiently, co-channel deployment of femto base stations such as HNBs or LTE HeNBs may be considered, providing an important use case in 3GPP standardization.

This means that HNBs may use the same spectrum as the wide area Node B, NBs, rather than an independent second spectrum area (say two blocks of 20 MHz each). However, sacrificing one carrier for HNBs takes away capacity from the wide area network, WAN, which may be undesirable e.g. in case operators do not have too much spectrum available.

Like wide area or macro base stations, small area base stations or femto base stations such as HNBs or HeNBs, may connect terminals such as user equipments like LTE user equipments to an operator's network by a physical broadband connection which may for example be a digital subscriber line, DSL, connection. Further they may operate in residential or e.g. small office environment and users may move between indoor and outdoor. Therefore a handover mechanism between the macro network and the femto cell such as HNB or HeNB may be provided. Regarding service capabilities HNBs, or HeNBs should be able to handle data and simultaneous voice calls.

Besides the issues mentioned above, another characteristic of femto base stations such as HeNBs is their ability to control access. Common access types are open and closed access. In an open subscriber group (OSG) scenario, any terminal/subscriber can be served by the base station such as HeNB. In a closed subscriber group (CSG) scenario, the base station such as HeNB serves only a limited number of subscribers that are allowed to access a given base station or HeNB.

In this context, interference from the femto cell such as HNBs or HeNBs to the wide area network is an issue. Initial operator deployments may use the same frequency for both the femto networks such as HeNB and the macro networks. With closed subscriber groups, access of a visiting user equipment not belonging to the closed group, to the femto base station or cell such as HeNBs is prevented, and wide area dead zones may be caused by the downlink interference from the HeNB which makes it also impossible to the visiting user equipment to access the wide area network.

SUMMARY

In accordance with one or more embodiments of the invention, a method and mechanism are provided which allow controlling or setting a transmit power of a femto cell.

In accordance with one or more embodiments of the invention, a method comprises: controlling or setting a transmit power of a femto cell depending on the received power of at least one neighbouring macro cell, such as power received at the femto cell from at least one neighbouring macro cell.

In accordance with one or more embodiments of the invention, a method may comprise controlling or setting the transmit power of the femto cell according to one or more of the following rules:

a first rule:

$$P_{tx}=\min(\alpha \cdot X+\beta, P_{max}),$$

wherein X has a value depending on $P_{wa}$,
or a second rule:

$$P_{tx}=\min(\alpha \cdot P_{wa}+\beta, P_{max}),$$

wherein X of the first rule is equal to $P_{wa}$,
or a third rule:

$$P_{tx}=\min(\alpha \cdot (P_{wa}-\delta\min(\gamma \cdot P_{wa2}-P_{wa},0))+\beta, P_{max}),$$

wherein X of the first rule is equal to $(P_{wa}-\delta\min(\gamma \cdot P_{wa2}-P_{wa}, 0)$, or has a value depending on the difference between $P_{wa}$ and $P_{wa2}$, wherein $P_{tx}$ indicates a used or actual downlink transmission power of the femto cell, $P_{max}$ a maximum allowed transmission power of the femto cell, $P_{wa}$ power received from a strongest macro co-channel cell, or the greater of the value of the power received from the strongest macro co-channel cell and a certain power value, $P_0$, corresponding to an equation max ($P_{wa}$, $P_0$), $P_{wa2}$ power received from a second strongest wide area co-channel cell, the function min( ) corresponds to selection of the smaller of the values in the brackets, the function max( ) corresponds to selection of the larger of the values in the brackets, parameter $\alpha$ may be set to a real value including the value 1, parameter $\beta$ may be set to a defined value, parameters $\delta$ and $\gamma$ may be set to real values including 1.

In accordance with one or more embodiments of the invention, a method may comprise one or more of, in any arbitrary combination:

the controlled transmit power of the femto cell is the downlink transmit power of the femto cell;

confirming with the macro cell that the power setting is appropriate, confirming via signalling with the macro cell that the power setting is appropriate, setting the parameter $\beta$ to an operator specific value, setting the parameter β to a value between 0 and 90 dB, or 30 and 60 dB, or 45 dB, signalling the parameter β on a control channel, such as a broadcast control channel, of the macro cell, changing a default value of at least one of α and β by signalling.

In accordance with one or more embodiments of the invention, a method may comprise one or more of, in any arbitrary combination:

the femto cell measures, by means of a user equipment receiver, power of a neighbouring wide area cell, and/or utilizes user equipment handover measurements, to derive the $P_{wa}$ value, the femto cell measures wide area interference periodically, the femto cell measures wide area interference during free downlink slots, the femto cell utilizes user equipment wide area signal strength information from user equipment handover measurements, utilizing, in case no value of the parameter α and/or β is signalled, or when no value of $P_{max}$ is measured or provided, default values or default parameters for $P_{max}$, α and/or β, taking a second, or further, interfering wide area or macro cells into account.

In accordance with one or more embodiments of the invention, a method may comprise one or more of, in any arbitrary combination:

limiting the power reduction of the femto cell, comparing a reception quality of the macro cell, or a reception power of the macro cell, to a threshold, refraining from reducing the transmit power of the femto cell if the reception quality or reception power of the macro cell is below the threshold, or a certain minimum value.

In accordance with one or more embodiments of the invention, a method may comprise one or more of, in any arbitrary combination:

when a reception power or quality of the macro cell falls below a threshold, increasing the transmit power of the femto cell, setting the transmit power higher if the macro cell signal suffers from interference.

In accordance with one or more embodiments of the invention, a method may comprise one or more of, in any arbitrary combination:

signalling a used transmit power value to a controller or network element receiving a response signal indicating at least one of a lower $P_{max}$, and a changed set of α and/or β parameter, receiving at least one of a higher $P_{max}$, and a changed set of α and/or β parameter, receiving an acknowledgement if the transmit power value is appropriate, receiving at least one of a different $P_{max}$ value, α, and β parameter, and configuring an appropriate transmit power value.

In accordance with one or more embodiments of the invention, an apparatus may comprise:

a controller, or means for controlling, configured to control or set a transmit power of a femto cell depending on a received power of at least one neighbouring macro cell.

In accordance with one or more embodiments of the invention, an apparatus may be configured to control or set the transmit power of the femto cell according to one of the following rules:

a first rule:

$$P_{tx}=\min(\alpha \cdot X+\beta, P_{max}),$$

wherein X has a value depending on $P_{wa}$, or a second rule:

$$P_{tx}=\min(\alpha \cdot P_{wa}+\beta, P_{max}),$$

wherein X of the first rule is equal to $P_{wa}$, or a third rule:

$$P_{tx}=\min(\alpha \cdot (P_{wa}-\delta \min(\gamma \cdot P_{wa2}-P_{wa},0))+\beta, P_{max}),$$

wherein X of the first rule is equal to $(P_{wa}-\delta \min(\gamma \cdot P_{wa2}-P_{wa}, 0)$, or has a value depending on the difference between $P_{wa}$ and $P_{wa2}$, wherein $P_{tx}$ indicates a used or actual downlink transmission power of the femto cell, $P_{max}$ a maximum allowed transmission power of the femto cell, $P_{wa}$ power received from a strongest macro co-channel cell, or the greater of the value of the power received from the strongest macro co-channel cell and a certain power value, $P_0$, corresponding to an equation max $(P_{wa}, P_0)$.

$P_{wa2}$ power received from a second strongest wide area co-channel cell, the function min( ) corresponds to selection of the smaller of the values in the brackets, the function max( ) corresponds to selection of the larger of the values in the brackets, parameter α may be set to a real value including the value 1, parameter β may be set to a defined value, parameters δ and γ may be set to real values including 1.

In accordance with one or more embodiments of the invention, an apparatus may be configured to one or more of, in any arbitrary combination:

the controlled transmit power of the femto cell is the downlink transmit power of the femto cell;

confirm with the macro cell that the power setting is appropriate, confirm via signalling with the macro cell that the power setting is appropriate, set the parameter β to an operator specific value, set the parameter β to a value between 0 and 90 dB, or 30 and 60 dB, or 45 dB, signal the parameter β on a control channel, such as a broadcast control channel, of the macro cell, change a default value of at least one of α and β by signalling.

In accordance with one or more embodiments of the invention, an apparatus may be configured to one or more of, in any arbitrary combination:

measure power of a neighbouring wide area or macro cell, measure power of a neighbouring wide area or macro cell by means of a user equipment receiver, utilize user equipment handover measurements, to derive the $P_{wa}$ value, measure macro cell interference periodically, measure macro cell interference during free downlink slots, utilize user equipment macro cell signal strength information from user equipment handover measurements, utilize, in case no value of the parameter α and/or β is signalled, or when no value of $P_{max}$ is measured or provided, one or more default values or default parameters for $P_{max}$, α and/or β, take a second, or further, interfering wide area or macro cells into account.

In accordance with one or more embodiments of the invention, an apparatus may be configured to one or more of, in any arbitrary combination:
- limit the power reduction of the femto cell,
- compare a reception quality of the macro cell, or a reception power of the macro cell, to a threshold,
- refrain from reducing the transmit power of the femto cell if the reception quality or reception power of the macro cell is below the threshold, or a certain minimum value.

In accordance with one or more embodiments of the invention, an apparatus may be configured to one or more of, in any arbitrary combination:
- increase the transmit power of the femto cell when a reception power or quality of the macro cell falls below a threshold,
- set the transmit power higher if the macro cell signal suffers from interference.

In accordance with one or more embodiments of the invention, an apparatus may be configured to one or more of, in any arbitrary combination:
- signal a used transmit power value to a controller or network element
- receive a response signal indicating at least one of a lower $P_{max}$, and a changed set of $\alpha$ and/or $\beta$ parameter,
- receive at least one of a higher $P_{max}$, and a changed set of $\alpha$ and/or $\beta$ parameter,
- receive an acknowledgement if the transmit power value is appropriate,
- receive at least one of a different $P_{max}$ value, $\alpha$, and $\beta$ parameter, and
- configure an appropriate transmit power value.

In accordance with one or more embodiments of the invention, the apparatus may be at least one of a base station, a node B, a home node B, an evolved home node B, a mobile station, a module, a chipset, or a part of or for a base station, a node B, a home node B, an evolved home node B, a mobile station, module, chipset.

In accordance with one or more embodiments of the invention, a computer program product is provided having computer-executable components configured to carry out or implement, when run on the computer, one more or all of the features mentioned above.

The computer program product may e.g. be a computer readable storage medium.

One or more embodiments provide one or more of network optimization, automated configuration and interference reduction e.g. in case of wide area cell with femto-cell co-channel deployment.

Embodiments of the invention allow to combat interference and dead zones.

In accordance with one or more embodiments of the invention the apparatus may e.g. be at least one of a base station, a femto base station, module, chipset, a set of routines or software or program, or a part of such entities.

In accordance with one or more embodiments of the invention a computer program product having computer-executable components configured to carry out or implement, when run on the computer, any one of the features mentioned above or below. The computer program product may e.g. be or embodied in a computer readable storage medium.

Other objects, features and advantages of the invention will become apparent from the drawings and the following description of embodiments of the invention.

DESCRIPTION OF EMBODIMENTS

Embodiments of the invention may not only be applied to femto cells or femto base stations but can also be applied to other types of base stations or access entities or the like.

In accordance with one or more embodiments of the invention, at least one, or both, of power control and power setting procedure of a femto base station, such as HeNB downlink power setting and/or power control, may e.g. be based taking account of the received power such as the power received by the femto base station from one or more surrounding wide area cells. In addition, path-loss to the nearest wide area cell may be taken into account, instead of or in addition to the distance to the nearest wide area cell for the co-channel deployment.

Further in accordance with one or more embodiments of the invention, a solution is provided wherein a femto base station such as HNB or HeNB does power setting according to a given rule and then via signalling it is confirmed with the network that the power setting is appropriate. One of the advantages of this embodiment or embodiments is that in changing environment (e.g. HeNB is moved, a window is opened or the shutters, blinds or jalousie is opened) the power adaptation can be done immediately and network signalling overhead can be kept as low as possible.

In accordance with one or more embodiments of the invention, the downlink transmission power of the femto cell such as HeNB may be set by the femto cell HeNB according to the following rule:

$$P_{tx} = \min(\alpha \cdot P_{wa} + \beta, P_{max}),$$

wherein
- $P_{tx}$ indicates a used or actual downlink transmission power of HeNB,
- $P_{max}$ a maximum allowed transmission power
- $P_{wa}$ power received from a strongest wide area co-channel cell.

$P_{max}$ is the maximum allowed HeNB transmission power. The parameter $\alpha$ may be set to a certain value such as e.g. so as to be equal to 1, and $\beta$ may be set e.g. to a predefined value which may e.g. be operator specific and may e.g. be signalled e.g. on the broadcast control channel of macro NBs.

An appropriate value of $\beta$ is for example ~45 dB (corresponding to typical minimum coupling loss (MCL) for HeNBs scenarios). These default values of $\alpha$ and $\beta$ may perhaps not give optimum performance-signal to interference plus noise ratio, SINR, of about 0 dB to a user equipment located close to the HeNB and may be changed (optimized) by signalling.

More generically, the downlink transmission power of the femto cell or base station such as HeNB may be set by the femto cell or base station or HeNB according to the following rule:

$$P_{tx} = \min(\alpha \cdot X + \beta, P_{max})$$

wherein X may be equal to $P_{wa}$ or a value depending on $P_{wa}$.

In accordance with one or more embodiments of the invention, one, more or all of the parameters $P_{max}$, α and β may be signalled by a controller such as operation, administration and maintenance, OAM, or may be set by default.

Further in accordance with one or more embodiments of the invention, the HeNB may have a user equipment, UE, receiver implemented to measure the strongest received wide area cell, and/or may utilize UE handover measurements, to get the $P_{wa}$ value.

With the formula given above, and to ensure that HeNB reacts fast on changing interference situation e.g. when wide area NBs downlink power changes dynamically e.g. due to traffic fluctuations, changes in wide area downlink power setting or changes in the HeNB environment (e.g. window is opened), one or more of the following procedures may be done, in any arbitrary combination, in accordance with one or more embodiments of the invention:

the femto cell such as HeNB measures wide area interference periodically e.g. during free downlink slots (in LTE multimedia broadcast multicast service, MBMS, sub-frames may be configured without transmitting MBMS information), or utilizes UE wide area signal strength information from UE handover measurements, the femto cell such as HeNB adapts $P_{tx}$ power dynamically according to the measurements or strength information, and the equation or rule mentioned above.

In a case when e.g. no value of the parameter α and/or β is signalled, or when no $P_{max}$ is measured, default values or default parameters for $P_{max}$, α and/or β may be utilized e.g. $P_{max}$=20 dBm, α=1.0 and β=45 dB.

Further optimizations of this formula may be made.

For instance, a second, or further, interfering wide area, WA, nodes may be taken into account.

A benefit of the formula is to maintain a reasonable performance of the wide area network, despite of interference from the femto cell such as HNB. However, the HNB may not be the only source of interference. Instead, other interference may be there as well, e.g. interference from the second strongest wide area, WA, cell.

It is possible to take this interference into account as well. As an example the above equation may be changed as follows:

$$P_{tx}=\min(\alpha \cdot (P_{wa}-\delta\min(\gamma \cdot P_{wa2}-P_{wa},0))+\beta, P_{max}),$$

$P_{wa2}$ Power received from second strongest wide area co-channel cell

In this embodiment, the above parameter X may be equal to $(P_{wa}-\delta\min(\gamma \cdot P_{wa2}-P_{wa}, 0))$, or a value depending on the difference between $P_{wa}$ and $P_{wa2}$.

For example, if the second strongest wide area cell is as strong as the strongest one (cell edge) then $P_{wa2}=P_{wa}$. Then even without any interference from the HNB it is difficult to get good performance from the wide area cell and any additional interference may degrade performance even more. Then, in accordance with one or more embodiments of the invention, it is proposed to generate even somewhat less interference. This is obtained in the formula, e.g. by setting δ=½ and γ=2. Then the formula may subtract $$P_{wa} - \delta\min(\gamma \cdot P_{wa2} - P_{wa}, 0) = P_{wa} - 1/2 \min(2P_{wa} - P_{wa}, 0)$$

$$= P_{wa} - \frac{1}{2}P_{wa}$$

$$= \frac{1}{2}P_{wa}.$$

The power of the HNB is in this embodiment set as if the received power from the wide area cell was half as high, and consequently the HNB power is set to a lower level. Then there is correspondingly less interference to the wide area cell.

The above formula is one but of course not the only way to take a second cell i.e. second interferer into account. Other modifications and embodiments may be designed that lead to a similar result. If the power of the second interferer gets lower, for example to less than half the power of the strongest cell, then $$\gamma \cdot P_{wa2}-P_{wa}<2\cdot P_{wa2}/2-P_{wa}=0$$

and the min function will become 0.

Thus no modification to the original formula will take place.

In another embodiment, other interference is also taken into account. Instead of only taking account of the second interfering WA node, it is also possible to take further nodes, or even all the existing interference, into account. Because the total interference can be stronger than the strongest cell, it may be necessary to limit the power reduction of the home base station such as HNB, because otherwise an infinite interference would cause a infinite power reduction i.e. cause the HNB to send with zero power.

Similar issues are discussed in the following for low received power, and can be generalized also to high interference.

In another embodiment, the quality of the wide area, WA, cell is checked or examined and compared to a certain threshold. When the quality of the wide area, WA, cell is below this certain threshold, the transmit power of the femto cell such as the HNB power is not reduced.

The formula above tries to make sure, that the interference to the WA cell is sufficiently below the WA cell power strength. However it may be the case that the reception power of the WA cell is already insufficient, e.g. when the femto cell such as HNB is placed outside of the coverage area of the WA cell. Then there is no usable communication possible with the WA cell and it is therefore pointless to protect the WA cell. Therefore the power of the HNB does not need to be reduced further.

In accordance with one or more embodiments of the invention, this can be achieved in the simplest way by not reducing the HNB power, if the WA reception power or reception quality is below a certain threshold. In this embodiment, the WA reception power or reception quality may be detected and compared below a certain threshold.

Alternatively, the term $P_{wa}$ can be replaced by max ($P_{wa}$, $P_0$) i.e. if the reception power falls below a certain minimum value such as e.g. $P_0$, the HNB power is not reduced any further.

Similarly, if the quality falls below a certain limit, instead a default power can be used in the formula above, e.g. the power at which the quality limit would just be reached. Furthermore, when the power (or quality) falls even below that threshold then the power reduction of the HNB can be even reduced i.e. the power of the HNB can be increased accordingly. The worse the reception quality of the WA cell is, the more "hopeless" the situation is and then the less consideration needs to be taken. E.g. if the reception strength of the WA cell is 10 dB below the reception threshold (minimum sensitivity), then it can only be received, say outside of a wall that has 10 dB attenuation. But behind that wall the HNB signal will be attenuated by (at least) 10 dB as well, so the HNB power can be set to an e.g. 10 dB higher power than if the reception of the WA NB was at the sensitivity level, because at the point where the WA NB is received at the sensitivity level, the signal of the HNB is already attenuated by at least 10 dB.

Similarly, the power can be set higher also if the WA NB signal suffers from interference. Here however, behind a 10 dB attenuating wall the signal may increase by 10 dB and at the same time the interference may be reduced by 10 dB, so the signal may become better by 20 dB. Consequently, the power of the HNB may be set to a power as if the WA power was higher by 20 dB. However, this may be a rare case that will not happen often, so it may be more reasonable to set it as if the WA power was $\zeta \cdot 10$ dB higher than actually experienced, where $\zeta < 2$. Actually $\zeta$ can even be below 1. Different values of $\zeta$ can be used whether the signal is power limited or interference limited, typically selecting a somewhat higher value for the interference limited case.

In accordance with one or more embodiments of the invention, a base station such as femto base station HeNB may signal a used $P_{tx}$ value to a controller or network element which is e.g. responsible for the configuration. The network may signal back a lower $P_{max}$ if downlink interference of HeNB on wide area is too high, and a changed set of $\alpha$ and/or $\beta$ parameter.

Alternatively, the network may signal a higher $P_{max}$ if downlink interference of HeNB on wide area is no issue, and a changed set of $\alpha$ and/or $\beta$ parameter.

In another embodiment, a base station such as a femto base station, HeNB, signals a used transmit power value, $P_{tx}$ value, to a controller or network element which is e.g. responsible for the configuration. The base station HeNB may receive an acknowledgement from the network, controller or network element, if the value is appropriate, or the base station HeNB may receive a different $P_{max}$ value, or/and $\alpha$, $\beta$ parameter, or the network element which is responsible for configuration may configure an appropriate transmit power, $P_{tx}$ value.

The implementation of the above described power control rule may be done in the base station HeNB. For the measurements, already available measurements from user equipment for handover purpose can be used, or measurements from an UE receiver implemented e.g. in the femto base station HeNB can be used.

A potential gain from implementing the above and below discussed power control rules in accordance with one or more embodiments of the invention, is shown in terms of SINR degradation obtained from simulation.

For the investigation an example of a deployment scenario was used comprising a macro network of 57 sites on a hexagonal grid.

Figure 1:
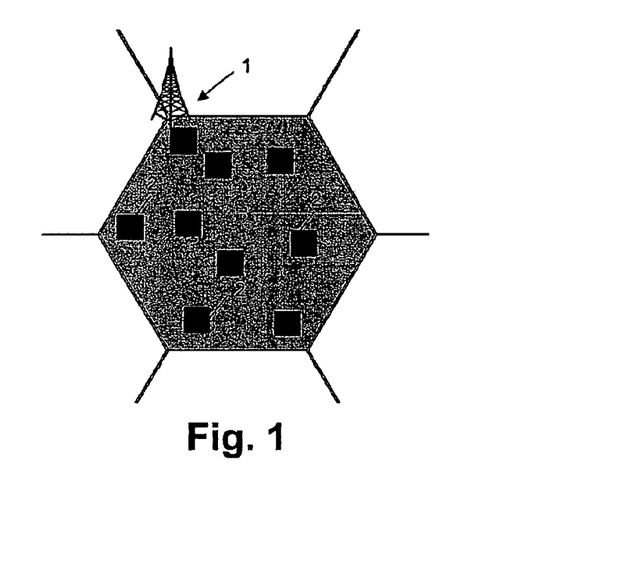
FIG. 1 illustrates embodiments of a network, method, system and apparatuses in accordance with embodiments of the invention.

FIG. 1 illustrates the deployment scenario used for performance degradation analysis, see the hexagonal cell 1 indicating one of the macro cells of the wide area network with neighboring macro cells, and high density of femto cells or home base stations 2 such as HeNB. In FIG. 1, squares 2 indicate femto cells or home base stations, or sites or houses with HeNBs inside. In the embodiment of FIG. 1, nine femto cells 2 are shown inside macro cell 1.

Figure 2:
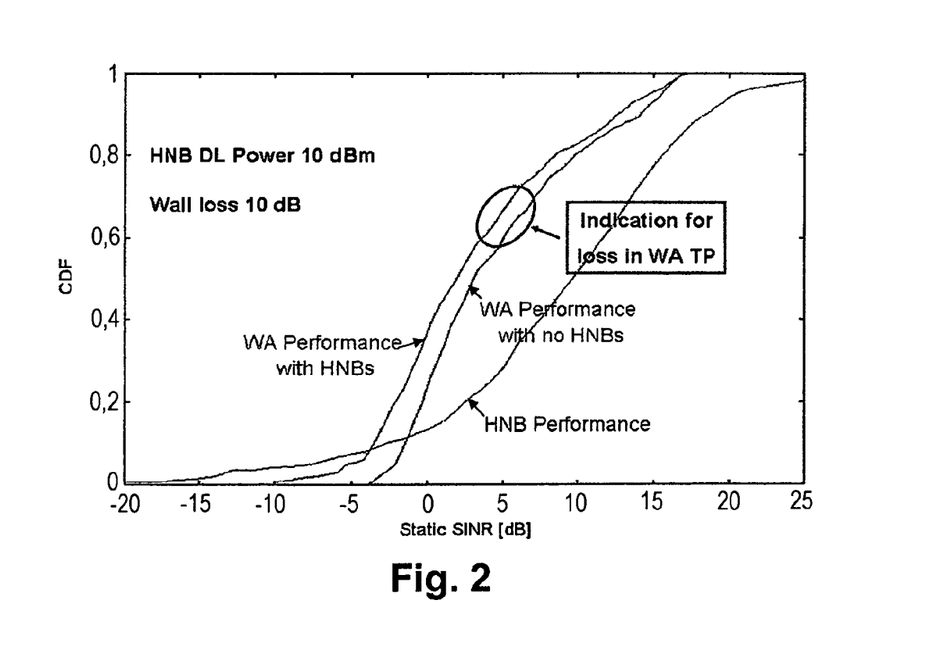
FIGS. 2 to 4 show performance evaluations of embodiments configured in accordance with possible implementations.
Figure 3:
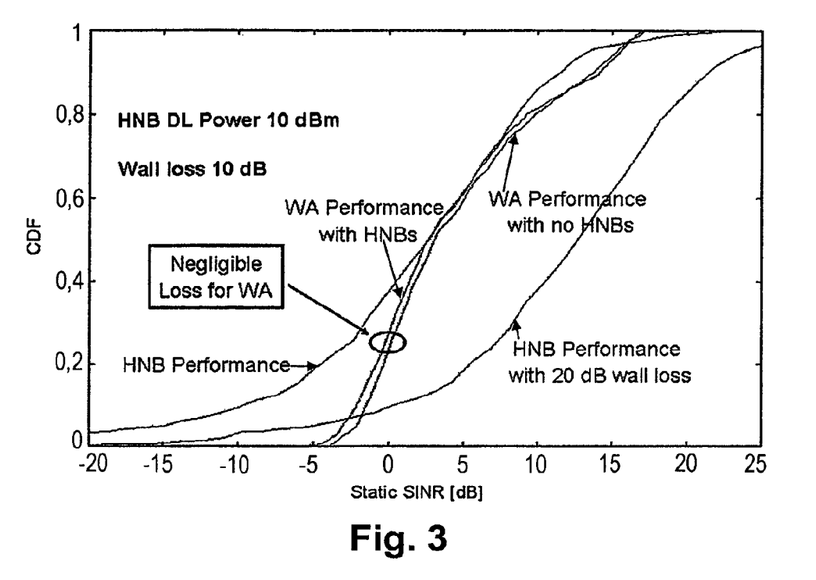
Figure 4:
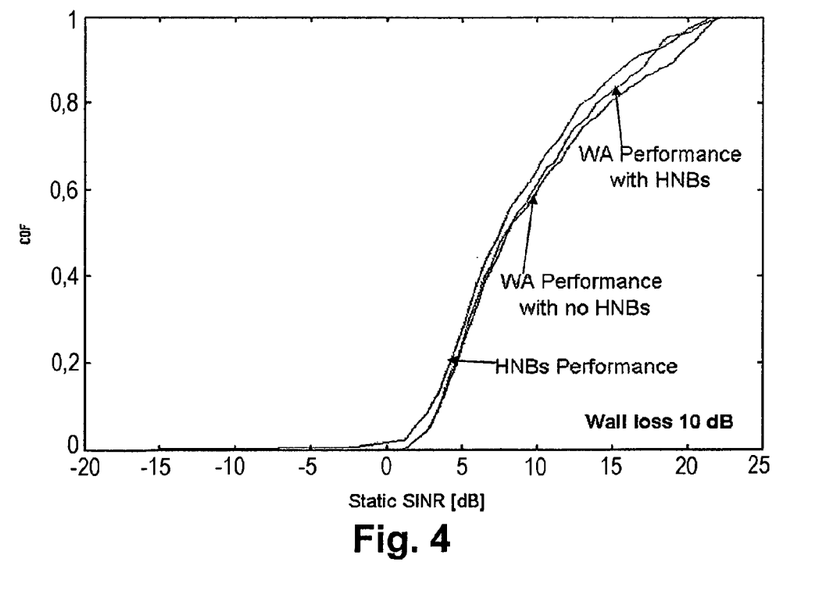

In FIGS. 2 to 4, three sets of downlink, DL, signal to interference plus noise ratio, SINR, statistics are shown as cumulative distribution function, CDF, comparison plots.

In the drawings, the macro network performance with no HeNBs located in a macro cell is shown by curves on the right-hand side within the ovals shown in FIGS. 2, 3. This corresponds to macro network DL performance with interference from neighbouring macro nodes, but without any interference from HeNBs which is basically the reference case for macro network performance.

The wide area, WA, or macro performance with HeNBs located over WA cell is illustrated by curves on the left-hand side within the ovals shown in FIGS. 2, 3. This corresponds to macro network downlink, DL, performance with interference from neighbouring macro nodes and additionally from nearby local area, LA or femto nodes.

Local area, LA, (femto) performance is illustrated by curves shown at the right hand side in FIG. 2, and on the lefthand side in FIGS. 3, 4. These curves illustrate HeNB DL performance with interference coming from WA layer and other HeNBs.

FIG. 2 shows downlink SINR CDF statistics for a case of transmit power $P_{tx}$ of 10 dBm with no power control. In FIG. 2 performance degradation of the wide area network due to HeNB interference can be seen. Home NodeB downlink power is set to 10 dBm. The wall loss caused by the walls of the building housing the femto base station is assumed to be 10 dB. The differences between the SINR curves in the ovals in FIGS. 2, 3 indicate a loss in wide area user and overall cell throughput.

It can be observed that for 10 dBm HeNB transmit power, macro network performance is degraded whereas HeNB performance is better in terms of SINR. However the aim of the proposed HeNB power control solution in accordance with one or more embodiments of the invention is to protect the macro layer as it provides most of overall network capacity and at the same time HeNBs should still provide decent performance.

As already stated above with reducing the DL HeNB power the degradation of the wide area performance can be mitigated.

However the HeNB performance suffers as well, which can be seen in FIG. 3.

FIG. 3 shows a case of DL SINR cumulative distribution function, cdf, statistics with $P_{tx}$=3 dBm, and no power control. Macro network performance loss is significantly reduced, i.e. the macro network performance is basically maintained as if no HeNBs were present, but HeNB performance (blue curve) is also harmed. In particular there is a tail in the CDF at low performance values i.e. there is a comparatively high probability that the user experiences a poor HeNB performance. This means that HeNBs cannot be considered to provide a good service reliably.

In the following embodiment the power control rule in accordance with one or more embodiments of the invention is applied with following parameters: $\alpha$=1; $\beta$=46 dB.

By introducing this power control rule or formula, the performance degradation of the wide area network can be avoided and on the other hand HeNB or HNB performance can be kept quite high.

The graph of FIG. 4 shows DL SINR statistics with power control formula applied. As shown, the wide area performance is beneficially quite similar for both cases of having, or not having, home Node Bs or base stations. Likewise HNBs performance is high.

With this setting macro network performance is kept nearly unchanged and this is a good benefit of the suggested femto cell, such as HeNB, power control. Further the performance of HeNB network is also very good at the same time.

The described power control formula may be standardized for the HeNB. Also signalling procedures and signalling parameters are provided in accordance with one or more embodiments of the invention. Embodiments of the invention may be applied to existing and future base stations such as femto base station like LTE Home Node Base station, and also e.g. to network elements that control HeNB behaviour e.g. a HeNB gateway. Embodiments may also be applied to access networks or radio access networks such as 3GPP RANs. Embodiments of the invention may be used to find a good or optimum compromise between HeNB performance and performance of the wide area network.

Figure 5:
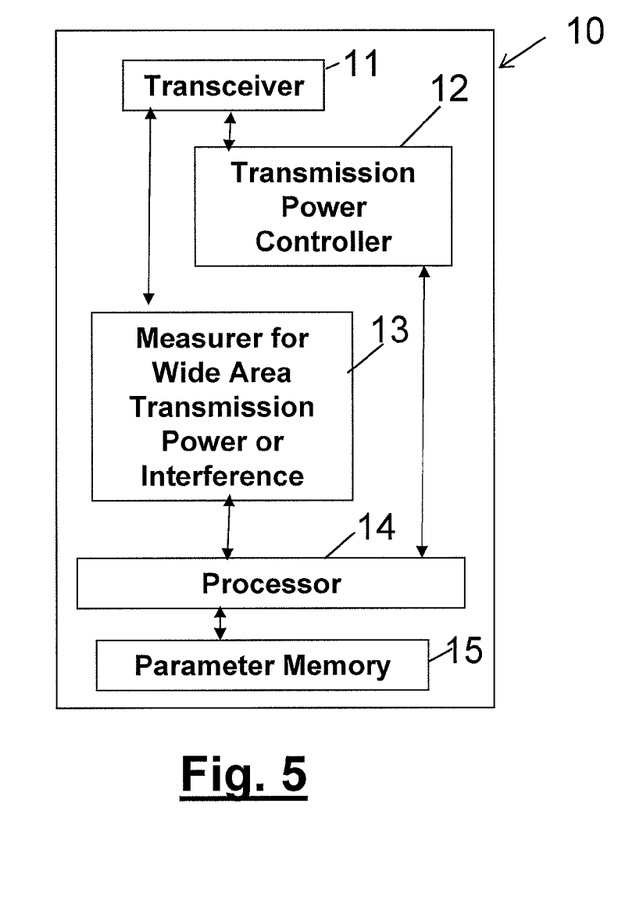
FIG. 5 illustrates a base station in accordance with one or more embodiments.

FIG. 5 illustrates an embodiment of an apparatus 10 such as e.g. a femto or home base station 10 like e.g. a HNB or HeNB. The apparatus 10 comprises a transceiver 11 for sending and/or receiving signals and traffic to and from other entities such as via an air interface and/or a broadband physical connection. A transmission power controller 12 is configured to control the transmit power such as downlink transmit power of the apparatus or base station 10, and may be controlled by a processor 14. Further, a measurer 13 is provided for measuring, detecting or estimating wide area transmission power $P_{wa}$ or interference of a wide area cell such as a base station of a cellular mobile network. A parameter memory 15 is configured to store one or more of the above mentioned parameters such as $\alpha$, $\beta$, $\gamma$, $P_{wa}$, $\delta$, threshold value, $\zeta$.

The apparatus 10 may e.g. be at least one of a mobile or stationary base station, or a module, chipset or part of such an entity.

Figure 6:
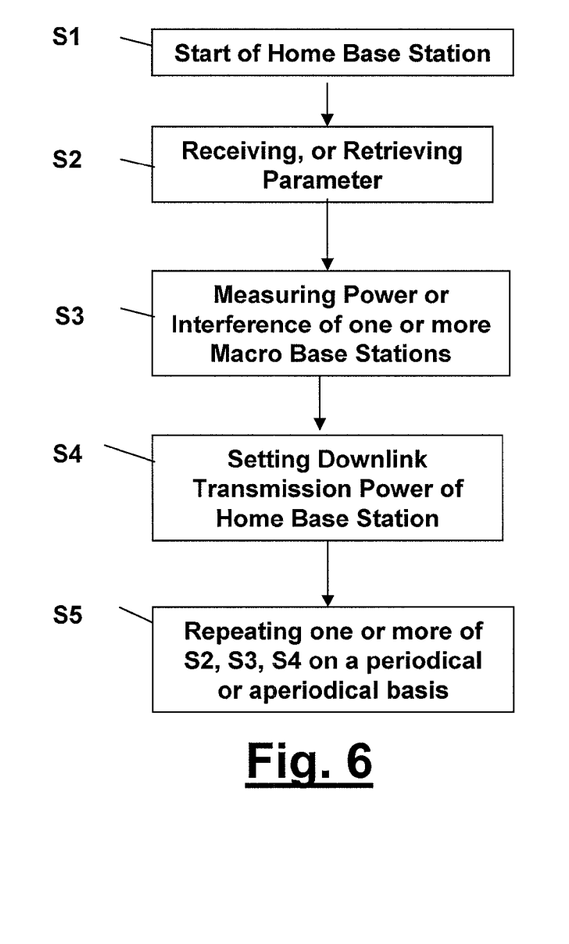
FIG. 6 shows a flow chart and method in accordance with another embodiment of the invention.

FIG. 6 shows a method in accordance with one or more embodiments of the invention. The method of FIG. 6 may be implemented e.g. in the apparatus or base station 10 of FIG. 5. In a function or step S1, a home base station such as a femto cell or base station 10 of FIG. 5 is or has been powered on. In a function or step S2, one or more of the above parameters $\alpha$, $\beta$, $\gamma$, $P_{wa}$, $\delta$, threshold value, $\zeta$ may be retrieved e.g. from the memory 15 of FIG. 5, or may be received from the wide area network or WA base station, as described above.

In a function or step S3, power or interference of one or more neighbouring macro base stations is measured.

In a function or step S4, the power, e.g. the downlink transmission power, of the apparatus 10 such as the home base station is controlled or set depending on the measurement result e.g. in accordance with one of the above formulas.

One or more or optionally all of the steps or functions S3, S4, or S2, S3, S4 may be repeated on a periodical or a periodical basis, as illustrated by step S5.

The sequence of the steps S2, S3, S4 may be arbitrarily changed.

In accordance with one or more embodiments, a computer program product or computer readable storage medium having computer-executable components is provided which is configured to carry out or implement, when run on the computer, one, several, or all of the features described above or shown in the drawings.

In accordance with one or more embodiments, a computer program product is provided comprising code means configured to carry out or implement, when run on a processor, at least one, several, or all of the features described above or shown in the drawings.

The computer program product may e.g. be embodied on a computer-readable medium.

A network may comprise one or more of such an apparatus as mentioned above or shown in the drawings.

The apparatus may be adapted for, or the network may have, any type of system or architecture comprising e.g. an evolved packet service, EPS, architecture, a long term evolution, LTE, architecture, a general packet radio service, GPRS, a global system for mobile communications, GSM, or any other type of fixed or mobile communication or fixed or mobile network or entity. The apparatus or network may comprise at least one of a serving general packet radio service support node, SGSN, a mobility management entity, MME, or a gateway. The apparatus may also be implemented in, or as part of, a media handling component such as a media gateway, media proxy, application server, gateway support node, etc.

For the purpose of the present invention as described herein above, it should be noted that any access or network technology may be used which may be any technology by means of which a user equipment can access a network or send or receive information. The network may be any device, unit or means by which a mobile or stationary entity or other user equipment may connect to and/or utilize services offered by the network. Such services may include, among others, data and/or (audio-) visual communication, data download etc.

Generally, the present invention is applicable e.g. in all those network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

The sequence of method steps or functions described above or shown in the drawings may be implemented in other sequences arbitrarily deviating from the above described or shown sequence of steps.

Further, the method, apparatuses and devices, may include only one, more or all of the features described above or shown in the drawings, in any arbitrary combination.

At least one, more, or all of the functions or method aspects or steps may be implemented as routines or software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented. Devices, apparatus, units, or means, and/or method steps may be implemented as hardware components of a stationary or mobile station, or a terminal, or a network element, or part, or chipset, or module thereof.

The apparatus may be a part, or chipset, or module of an entity such as a terminal, user equipment, network entity etc. The apparatus or software may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

The invention claimed is:
1. A method, comprising:
  determining power received from a strongest macro co-channel cell of at least one neighbouring macro cell; and controlling or setting a transmit power of a femto cell depending on the lesser of
  a multiple of either the received power or a greater value of the power received from the strongest macro co-channel cell and a certain power value, and an added parameter, wherein the multiple may be set to a real value including the value 1, and wherein the added parameter may be set to a defined value; and
  a maximum allowed transmit power of the femto cell.

2. The method of claim 1, comprising controlling or setting the transmit power of the femto cell according to one of the following rules:
a first rule:

$$P_{tx}=\min(\alpha \cdot X+\beta, P_{max}),$$

wherein X has a value depending on $P_{wa}$, or a second rule:

$$P_{tx}=\min(\alpha \cdot P_{wa}+\beta, P_{max}),$$

wherein X of the first rule is equal to $P_{wa}$, or a third rule:

$$P_{tx}=\min(\alpha \cdot (P_{wa}-\delta \min(\gamma \cdot P_{wa2}-P_{wa},0))+\beta, P_{max}),$$

wherein X of the first rule is equal to $(P_{wa}-\delta \cdot P_{wa2}-P_{wa}, 0)$, or has a value depending on the difference between $P_{wa}$ and $P_{wa2}$,
wherein
  $P_x$ indicates a used or actual downlink transmission power of the femto cell,
  $P_{max}$ a maximum allowed transmission power of the femto cell,
  $P_{wa}$ power received from a strongest macro co-channel cell, or the greater of the value of the power received from the strongest macro co-channel cell and a certain power value, $P_0$, corresponding to an equation max $(P_{wa}, P_0)$,
  $P_{wa2}$ power received from a second strongest wide area co-channel cell,
  the function min( ) corresponds to selection of the smaller of the values in the brackets,
  the function max( ) corresponds to selection of the larger of the values in the brackets,
  parameter $\alpha$ may be set to a real value including the value 1,
  parameter $\beta$ may be set to a defined value,
  parameters $\delta$ and $\gamma$ may be set to real values including 1.

3. The method of claim 2, comprising one or more of; in any arbitrary combination:
  the controlled transmit power of the femto cell is the downlink transmit power of the femto cell;
  confirming with the macro cell that the power setting is appropriate,
  confirming via signalling with the macro cell that the power setting is appropriate,
  setting the parameter $\beta$ to an operator specific value,
  setting the parameter $\beta$ to a value between 0 and 90 dB, or 30 and 60 dB, or 45 dB,
  signalling the parameter $\beta$ on a control channel, such as a broadcast control channel, of the macro cell,
  changing a default value of at least one of $\alpha$ and $\beta$ by signalling.

4. The method of claim 2, comprising one or more of, in any arbitrary combination:
  the femto cell measures, by means of a user equipment receiver, power of a neighbouring wide area cell, utilizes user equipment handover measurements, or both measures and utilizes to derive the $P_{wa}$ value,
  the femto cell measures wide area interference periodically,
  the femto cell measures wide area interference during free downlink slots,
  the femto cell utilizes user equipment wide area signal strength information from user equipment handover measurements,
  utilizing, in case no value of the parameter $\alpha$, $\beta$, or both $\alpha$ and $\beta$ is signalled, or when no value of $P_{max}$ is measured or provided, default values or default parameters for $P_{max}$, $\alpha$, $\beta$, or both $\alpha$ and $\beta$,
  taking a second, or further, interfering wide area or macro cells into account.

5. The method of claim 2, comprising one or more of, in any arbitrary combination:
  limiting the power reduction of the femto cell,
  comparing a reception quality of the macro cell, or a reception power of the macro cell, to a threshold,
  refraining from reducing the transmit power of the femto cell if the reception quality or reception power of the macro cell is below the threshold, or a certain minimum value.

6. The method of claim 2, comprising one or more of, in any arbitrary combination:
  when a reception power or quality of the macro cell falls below a threshold, increasing the transmit power of the femto cell,
  setting the transmit power higher if the macro cell signal suffers from interference.

7. The method of claim 2, comprising one or more of, in any arbitrary combination:
  signalling a used transmit power value to a controller or network element receiving a response signal indicating at least one of a lower $P_{max}$, and a changed set of $\alpha$, $\beta$, or both $\alpha$ and $\beta$ parameter,
  receiving at least one of a higher $P_{max}$, and a changed set of $\alpha$, $\beta$, or both $\alpha$ and $\beta$ parameter,
  receiving an acknowledgement if the transmit power value is appropriate,
  receiving at least one of a different $P_{max}$ value, $\alpha$, and $\beta$ parameter, and
  configuring an appropriate transmit power value.

8. An apparatus, comprising:
at least one processor, and at least one memory including computer program code, wherein the at least one memory and the computer code are configured, with the at least one processor, to cause the apparatus to at least perform the following:
  determining power received from a strongest macro co-channel cell of at least one neighbouring macro cell; and
  controlling or setting a transmit power of a femto cell depending on the lesser of
    a multiple of either the received power or a greater value of the power received from the strongest macro co-channel cell and a certain power value, and an added parameter, wherein the multiple may be set to a real value including the value 1, and wherein the added parameter may be set to a defined value; and
    a maximum allowed transmit power of the femto cell.

9. The apparatus of claim 8, wherein controlling or setting the transmit power of the femto cell is done according to one of the following rules:
a first rule:

$$P_{tx}=\min(\alpha \cdot X+\beta, P_{max}),$$

wherein X has a value depending on $P_{wa}$, or a second rule:

$$P_{tx} = \min(\alpha \cdot P_{wa} + \beta, P_{max}),$$

wherein X of the first rule is equal to $P_{wa}$, or a third rule:

$$P_{tx} = \min(\alpha \cdot (P_{wa} - \delta \min(\gamma \cdot P_{wa2} - P_{wa}, 0)) + \beta, P_{max}),$$

wherein X of the first rule is equal to $(P_{wa} - \delta \min(\gamma \cdot P_{wa2} - P_{wa}, 0))$, or has a value depending on the difference between $P_{wa}$ and $P_{wa2}$, wherein
- $P_{tx}$ indicates a used or actual downlink transmission power of the femto cell,
- $P_{max}$ a maximum allowed transmission power of the femto cell,
- $P_{wa}$ power received from a strongest macro co-channel cell, or the greater of the value of the power received from the strongest macro co-channel cell and a certain power value, $P_0$, corresponding to an equation max $(P_{wa}, P_0)$,
- $P_{wa2}$ power received from a second strongest wide area co-channel cell,
- the function min( ) corresponds to selection of the smaller of the values in the brackets,
- the function max( ) corresponds to selection of the larger of the values in the brackets,
- parameter $\alpha$ may be set to a real value including the value 1,
- parameter $\beta$ may be set to a defined value,
- parameters $\delta$ and $\gamma$ may be set to real values including 1.

10. The apparatus of to claim 9, wherein the at least one memory and the computer code are configured, with the at least one processor, to cause the apparatus to at least perform one or more of the following, in any arbitrary combination:
   the controlled transmit power of the femto cell is the downlink transmit power of the femto cell;
   confirm with the macro cell that the power setting is appropriate,
   confirm via signalling with the macro cell that the power setting is appropriate,
   set the parameter $\beta$ to an operator specific value,
   set the parameter $\beta$ to a value between 0 and 90 dB, or 30 and 60 dB, or 45 dB,
   signal the parameter $\beta$ on a control channel, such as a broadcast control channel, of the macro cell,
   change a default value of at least one of $\alpha$ and $\beta$ by signalling.

11. The apparatus of claim 9, wherein the at least one memory and the computer code are configured, with the at least one processor, to cause the apparatus to at least perform one or more of the following, in any arbitrary combination:
   measure power of a neighbouring wide area or macro cell,
   measure power of a neighbouring wide area or macro cell by means of a user equipment receiver,
   utilize user equipment handover measurements, to derive the $P_{wa}$ value,
   measure macro cell interference periodically,
   measure macro cell interference during free downlink slots,
   utilize user equipment macro cell signal strength information from user equipment handover measurements,
   utilize, in case no value of the parameter $\alpha$, $\beta$, or both $\alpha$ and $\beta$ is signalled, or when no value of $P_{max}$ is measured or provided, one or more default values or default parameters for $P_{max}$, $\alpha$, $\beta$, or both $\alpha$ and $\beta$,
   take a second, or further, interfering wide area or macro cells into account.

12. The apparatus of claim 9, wherein the at least one memory and the computer code are configured, with the at least one processor, to cause the apparatus to at least perform one or more of the following, in any arbitrary combination:
   limit the power reduction of the femto cell,
   compare a reception quality of the macro cell, or a reception power of the macro cell, to a threshold,
   refrain from reducing the transmit power of the femto cell if the reception quality or reception power of the macro cell is below the threshold, or a certain minimum value.

13. The apparatus of claim 9, wherein the at least one memory and the computer code are configured, with the at least one processor, to cause the apparatus to at least perform one or more of the following, in any arbitrary combination:
   increase the transmit power of the femto cell when a reception power or quality of the macro cell falls below a threshold,
   set the transmit power higher if the macro cell signal suffers from interference.

14. The apparatus of claim 9, wherein the at least one memory and the computer code are configured, with the at least one processor, to cause the apparatus to at least perform one or more of the following, in any arbitrary combination:
   signal a used transmit power value to a controller or network element
   receive a response signal indicating at least one of a lower $P_{max}$, and a changed set of $\alpha$, $\beta$, or both $\alpha$ and $\beta$ parameter,
   receive at least one of a higher $P_{max}$, and a changed set of $\alpha$, $\beta$, or both $\alpha$ and $\beta$ parameter,
   receive an acknowledgement if the transmit power value is appropriate,
   receive at least one of a different $P_{max}$ value, $\alpha$, and $\beta$ parameter, and
   configure an appropriate transmit power value.

15. The apparatus of claim 8, wherein the apparatus is at least one of a base station, a node B, a home node B, an evolved home node B, a mobile station, a module, a chipset, or a part of or for a base station, a node B, a home node B, an evolved home node B, a mobile station, module, chipset.

16. A computer program product embodied on a non-transitory computer-readable medium in which a computer program is stored that when being executed by a computer is configured to provide instructions to control or carry out the method of claim 1.

17. A computer program product embodied on a non-transitory computer-readable medium in which a computer program is stored that when being executed by a computer is configured to provide instructions to control or carry out the method of claim 2.

* * * * *

UNITED STATES PATENT AND TRADEMARK OFFICE
CERTIFICATE OF CORRECTION

Page 1 of 1

PATENT NO. : 8,971,949 B2
APPLICATION NO. : 13/121339
DATED : March 3, 2015
INVENTOR(S) : Juergen Michel, Bernhard Raaf and Agnieszka Szufarska It is certified that error appears in the above-identified patent and that said Letters Patent is hereby corrected as shown below:

In the Claims

In Claim 2:

Column 13, lines 24-25, "($P_{wa}$- δ min(δ·$P_{wa2}$-$P_{wa}$,0)" should be deleted and -- ($P_{wa}$- δ min(γ·$P_{wa2}$-$P_{wa}$,0) -- should be inserted; and column 13, line 28, "$P_x$" should be deleted and -- $P_{tx}$ -- should be inserted.

Signed and Sealed this
Thirtieth Day of June, 2015

Michelle K. Lee
*Director of the United States Patent and Trademark Office*